Patented Oct. 30, 1934

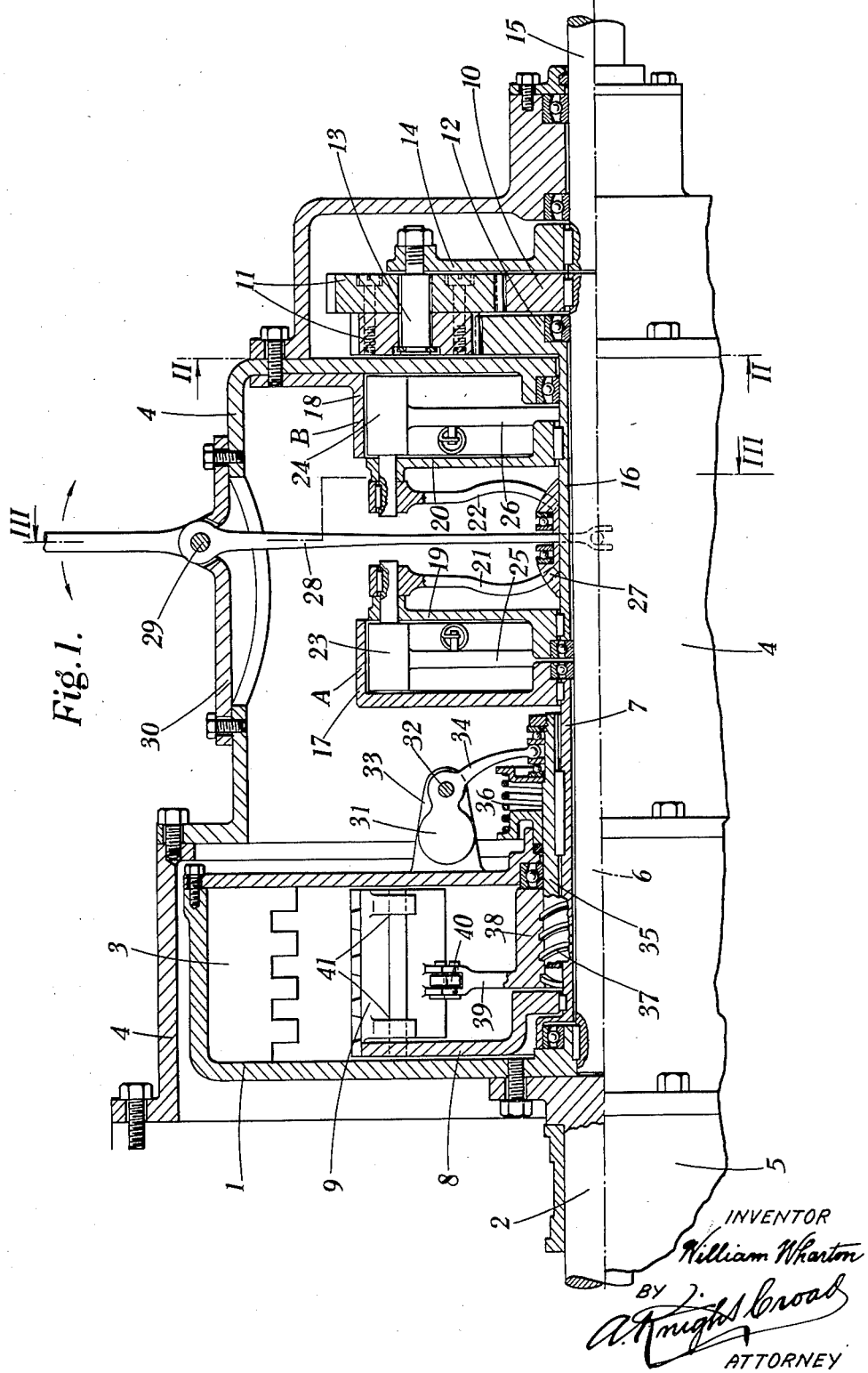

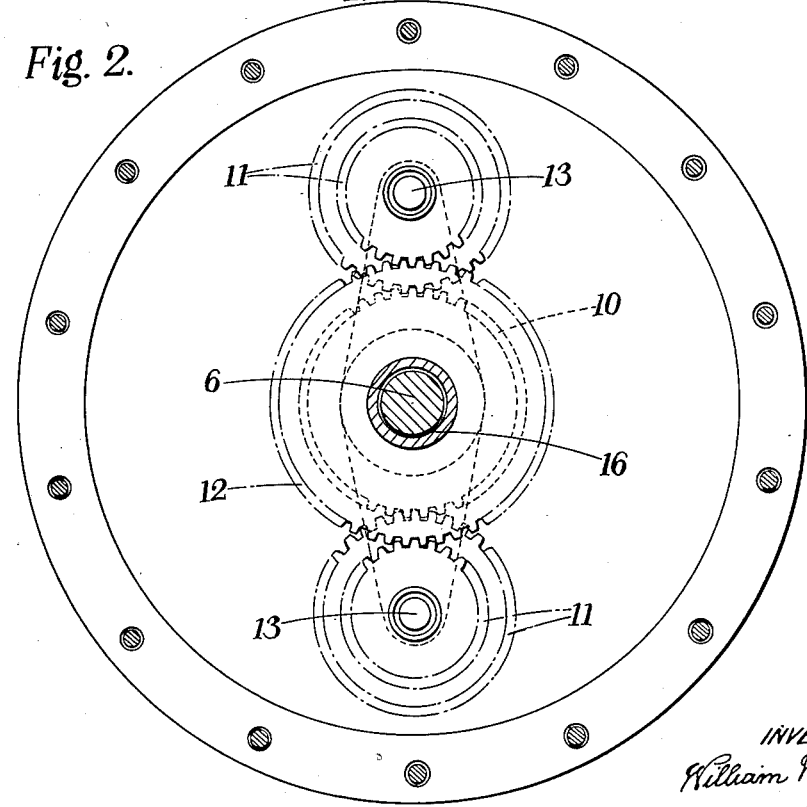

1,979,088

UNITED STATES PATENT OFFICE 1,979,088

VARIABLE SPEED POWER TRANSMISSION MECHANISM

William Wharton, Kendal, England, assignor to Wharton Variable Gears Limited, London, England, a British company Application March 29, 1934, Serial No. 718,092
In Great Britain April 3, 1933

6 Claims. (Cl. 74—260)

This invention relates to a variable speed power transmission mechanism or gearing of the type which automatically adjusts itself to varying conditions of drive and load, and is especially suitable for use on vehicles driven by internal combustion engines, and is adapted to be connected to any suitable type of variable coupling such as an hydraulic or fluid fly-wheel preferably of the adjustable type; for example, that described in the specification to my British Patent No. 192,244. This invention has for its object the provision of an automatically variable gear drive of simple and compact construction which is easy to operate and provides a smooth transmission of power from a driving to a driven member under varying conditions of speed and torque.

According to the present invention the mechanism consists, in combination with a variable coupling having driving and driven members, of an epicyclic train of gearing comprising driving and driven sun wheels and planet wheels, the driving sun wheel being connected to the driving member of the coupling, and means are provided for connecting the driven sun wheel to the driven member of the coupling and the spindles of the planet wheels are adapted to be connected to a member to be driven.

Means are also provided for locking the driven sun wheel against rotation to provide a reverse rotation of the member to be driven.

One embodiment of the invention for use on motor road vehicles and combined with a variable hydraulic coupling of the type described in the aforesaid specification will be described with reference to the accompanying drawings in which:—

Figure 1 is a partial side elevation with the upper half in section of the improved mechanism and hydraulic coupling;

Figure 2 is a transverse section on the line II—II of Figure 1, and,

Figure 3 is a transverse section on the line III—III of Figure 1.

The casing 1 of the variable hydraulic coupling is mounted on the rear end of the engine shaft 2 and is provided on its inner periphery with a plurality of fixed driving vanes 3 and is enclosed within an outer casing 4 bolted to the rear end of the engine crank case 5.

A driving shaft 6 is keyed to the casing 1 and extends through and beyond a coaxially mounted sleeve 7 secured to a plate 8 on which the variable or driven vanes 9 of the coupling are pivotally mounted. Secured on the end of the driving shaft 6 is a sun or driving wheel 10 of an epicyclic train of gearing, which train comprises a plurality of planet wheels 11 and a second or driven sun wheel 12, the spindles 13 of the planet wheels 11 being mounted on arms 14 of a spider secured to the driven shaft 15 which is connected through a suitable coupling to the propeller shaft of the vehicle, and the driven sun wheel 12 is mounted on and secured to a second sleeve 16 also coaxial with and rotatably mounted on the driving shaft 6. Mounted coaxially with the driving shaft 6 are two internally expanding brakes A and B which comprise brake drums 17 and 18 secured respectively to the coupling sleeve 7 and to the outer casing 4, reaction plates 19 and 20 keyed on to the sleeve 16 and arms 21 and 22 pivotally mounted on the reaction plates 19 and 20 which operate cams 23 and 24 to expand the brake shoes 25 and 26. The free ends of the operating arms 21 and 22 bear against a spherical member 27 rotatably mounted on and adapted to be moved along the sleeve 16 by means of a forked hand lever 28 which is pivoted at 29 in a cover plate 30 on the casing 4.

The angularity of the variable vanes 9 of the hydraulic coupling is automatically varied according to the speed at which the latter rotates by the centrifugal movement of a plurality of weights 31 pivoted at 32 to arms or lugs 33 on the coupling casing 1 and provided with arms 34 which are adapted to move a sleeve 35 longitudinally against the action of a coiled spring 36. The sleeve 35 rotates with and is movable longitudinally on the coupling sleeve 7 and is provided with a coarse thread 37 which engages a similar internal thread on a collar 38 having a plurality of arms 39 to the outer ends of which the variable vanes 9 are connected by means of links 40. As the weights 31 move outwardly under the action of centrifugal force they cause the arms 34 to move the sleeve 35 longitudinally on the coupling sleeve 7 which produces a rotary movement of the collar 38 which in turn causes the variable vanes 9 to turn about their pivots 41.

The operation of the mechanism is as follows:—

When the vehicle is at rest and the engine is running the two brakes A and B of the mechanism are both disengaged, thus disconnecting the driven sun wheel 12 from the coupling sleeve 7 and enabling this wheel 12 to rotate on the driving shaft 6; the driven shaft 15 and planet wheel spindles 13 are held against rotation by the vehicle brakes, and the engine rotates the driving sun wheel 10 which in turn rotates the driven sun wheel 12 through the planet wheels 11.

When it is desired to move the vehicle in a forward direction the vehicle brakes are released and the brake A is applied by moving the hand lever 28 so that the spherical member 27 is moved towards the brake A, thereby connecting the driven vanes 9 and sleeve 7 of the hydraulic coupling with the driven sun wheel 12. The engine is at first rotating slowly and the weights 31 are not moved outwards by centrifugal force so that the driven vanes 9 are in the position of maximum slip and slip will readily occur in the hydraulic coupling, and its sleeve 7 with the driven sun wheel 12 will rotate in the same direction as, but at a lower speed than, the driving shaft 6 and driving sun wheel 10. As the speed of the engine is increased the weights 31 will commence to move outwards causing the driven vanes 9 to turn into an intermediate position and the amount of slip in the coupling will be decreased, and as the speed of the driven sun wheel 12 approaches that of the driving sun wheel 10 the planet wheels 11 with their spindles 13 will commence to rotate round the sun wheels 10 and 12 and in the same direction, thus rotating the driven shaft 15 and causing the vehicle to move forward. Thereafter the speed of the driven shaft 15 will increase until a balance is attained between the load on this shaft 15 and the engine power available on the driving shaft 6.

The driven shaft 15 will only attain the same speed as the driving shaft 6 when there is no load on the former shaft 15, such as when the vehicle is coasting down a slight incline; in this state the two sun wheels 10 and 12 are rotating at the same speed and there is no slip in the hydraulic coupling.

When it is desired to move the vehicle in a reverse direction the brake A is disengaged and the second brake B is applied by moving the spherical member 27 towards brake B by means of the hand lever 28 which locks the driven sun wheel 12 and its sleeve 16 against rotation; as the driving shaft 6 and its sun wheel 10 rotate in the same direction as before, the planet wheels 11 and their spindles 13 will rotate round the sun wheels 10 and 12 at a reduced speed in the reverse direction causing the driven shaft 15 to rotate also in this direction.

If desired, instead of the variable vanes 9 being moved automatically by means of the weights 31, said vanes may be moved by means of a hand lever secured to the arm 34 by means of which lever the amount of slip occurring in the hydraulic coupling may be varied for any given speed and thus the balance of power between the load on the driven shaft 15 and the power available on the driving shaft 6 may be varied as desired.

The mechanism may be used in the transmission system of a vehicle either separately or in conjunction with a conventional type of gear box having two or more gear ratios.

In order to obtain the full advantages of this transmission mechanism the rear axle gear ratio should have a higher value than is at present the common practice for motor road vehicles having the normal transmission system.

What I claim is:—

1. A variable speed power transmission mechanism comprising in combination with a variable coupling having driving and driven members, an epicyclic train of gearing having driving and driven sun wheels and planet wheels, means connecting the driving sun wheel with the driving member of the coupling, means for connecting the driven sun wheel to the driven member of the coupling, means connecting the planet wheels to a member to be driven and means for locking the driven sun wheel against rotation.

2. A variable speed power transmission mechanism comprising in combination with a variable coupling having driving and driven members, an epicyclic train of gearing having driving and driven sun wheels and planet wheels, means connecting the driving sun wheel with the driving member of the coupling, means connecting the planet wheels to a member to be driven, a sleeve rotatably mounted on the driving shaft and secured to the driven sun wheel, a brake mounted on said sleeve for connecting the driven sun wheel to the driven member of the coupling and a second brake mounted on said sleeve for locking the driven sun wheel against rotation.

3. A variable speed power transmission mechanism comprising in combination with a variable coupling having driving and driven members, an epicyclic train of gearing comprising a driving sun wheel connected to the driving member of the coupling, a driven sun wheel and planet wheels connected to a member to be driven, a sleeve rotatably mounted on the driving shaft and secured to said driven sun wheel, a second sleeve rotatably mounted on the driving shaft and secured to the driven member of the coupling and two coacting brake elements secured respectively to said first and second named sleeves for connecting said driven sun wheel to the driven member of the coupling.

4. A variable speed power transmission mechanism comprising in combination with a variable coupling having driving and driven members, an epicyclic train of gearing comprising a driving sun wheel connected to the driving member of the coupling, a driven sun wheel, and planet wheels connected to a member to be driven, a sleeve rotatably mounted on the driving shaft and secured to said driven sun wheel, a second sleeve rotatably mounted on the driving shaft and secured to the driven member of the coupling, two coacting brake elements secured respectively to said first and second named sleeves for connecting said driven sun wheel to the driven member of the coupling, and two additional coacting brake elements secured respectively to said first mentioned sleeve and to the casing of the mechanism for locking said driven sun wheel against rotation.

5. A variable speed power transmission mechanism comprising in combination with a variable coupling having driving and driven members, an epicyclic train of gearing having driving and driven sun wheels and planet wheels, means connecting the driving sun wheel with the driving member of the coupling, means connecting the planet wheels to a member to be driven, a sleeve rotatably mounted on the driving shaft and secured to the driven sun wheel, a brake mounted on said sleeve for connecting the driven sun wheel to the driven member of the coupling, a second brake mounted on said sleeve for locking the driven sun wheel against rotation, a brake operating lever pivotally mounted on each of said brakes, a spherical member slidably mounted on said sleeve with which said brake operating levers coact and a forked hand lever pivotally mounted in the casing of the mechanism engaging said spherical member.

6. A variable speed transmission mechanism comprising in combination with a variable coupling having driving and driven members, an epicyclic train of gearing comprising driving and driven sun wheels and planet wheels, a driving shaft secured to said driving sun wheel and to said driving member of the coupling, a spider secured to the shaft to be driven, spindles on said spider upon which said planet wheels are mounted, a sleeve rotatably mounted on the driving shaft and secured to said driven sun wheel, a second sleeve rotatably mounted on the driving shaft and secured to the driven member of the coupling, two coacting brake elements secured respectively to said first and second mentioned sleeves, two additional coacting brake elements secured respectively to said first mentioned sleeve and to the casing of the mechanism, two brake operating levers pivotally mounted on said brake elements secured to the first mentioned sleeve, a spherical member slidably mounted on said first mentioned sleeve with which the ends of said brake operating levers coact and a forked hand lever pivotally mounted in the casing of the mechanism and coacting with said spherical member.

WILLIAM WHARTON.